United States Patent
Saxton et al.

(10) Patent No.: US 6,457,013 B1
(45) Date of Patent: *Sep. 24, 2002

(54) DATA FORMATING PROPERTY MODIFIERS

(75) Inventors: Catherine J. Saxton, Issaquah, WA (US); Thomas W. Saxton, Issaquah, WA (US); Mark John Walker, Redmond, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,414

(22) Filed: Oct. 14, 1998

Related U.S. Application Data

(62) Division of application No. 08/893,939, filed on Jul. 16, 1997, now Pat. No. 6,016,492.

(51) Int. Cl.[7] .................................................. G06F 6/00
(52) U.S. Cl. ....................................... 707/101; 707/104
(58) Field of Search ...................................... 707/1–225

(56) References Cited

U.S. PATENT DOCUMENTS 5,446,575 A    8/1995  Lysakowski
5,542,078 A    7/1996  Martel et al.
5,627,972 A  * 5/1997  Shear ..................... 395/200.76
5,692,157 A  * 11/1997  Williams ..................... 395/500
5,794,042 A  * 8/1998  Terada et al. ................ 395/701

* cited by examiner

Primary Examiner—Thomas G. Black
Assistant Examiner—John G. Mills
(74) Attorney, Agent, or Firm—Merchant & Gould

(57) ABSTRACT

Property modifiers stored on a computer-readable medium for formatting information associated with a computer file, such as an electronic document. Each property modifier includes a size field having information indicating the size of its property modifier argument and an index field having an index into a property information array. A program module can traverse a group of property modifiers by utilizing the information in the size field of the current property modifier to determine the location of the next property modifier. Formatting is applied to information of the computer file by using the index of each property modifier to access formatting information maintained in the property information array. Each property modifier can store encoded information corresponding to the type of object to receive formatting, the size of the property modifier's argument, and an index into the property information array associated with an executable computer program. Rather than pre-allocate space in the executable portion of a program module, the property modifier itself contains information embedded therein that indicates the size of the parameter of the property modifier.

17 Claims, 6 Drawing Sheets

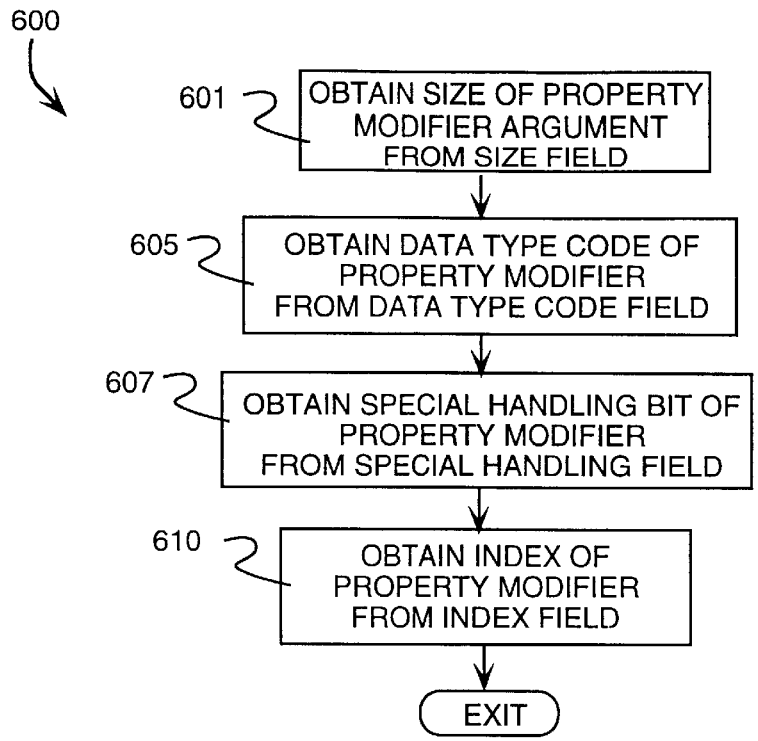
FIG. 6 DECODE CURRENT PROPERTY MODIFIER
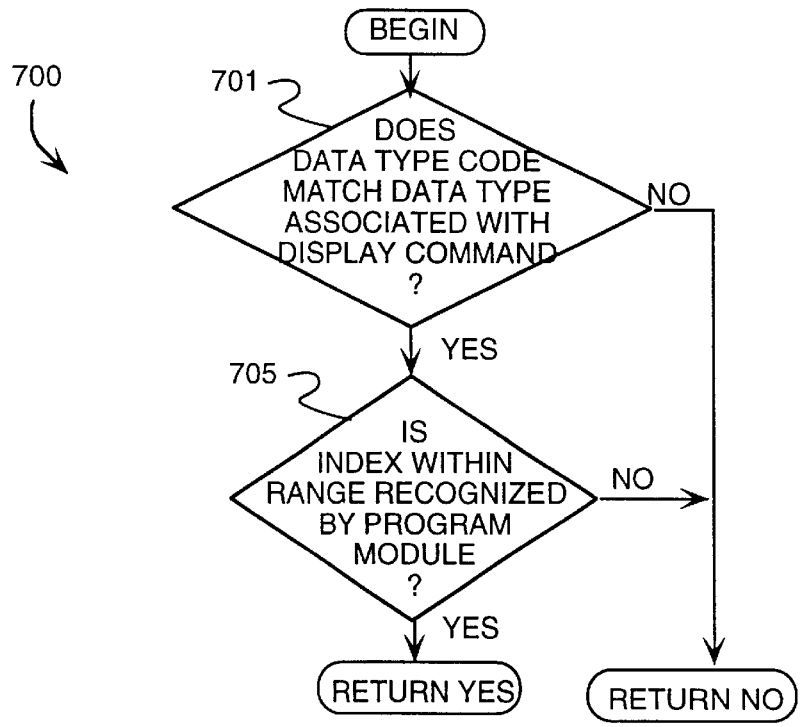
FIG. 7 DETERMINE WHETHER PROGRAM MODULE CAN PROCESS CURRENT PROPERTY MODIFIER

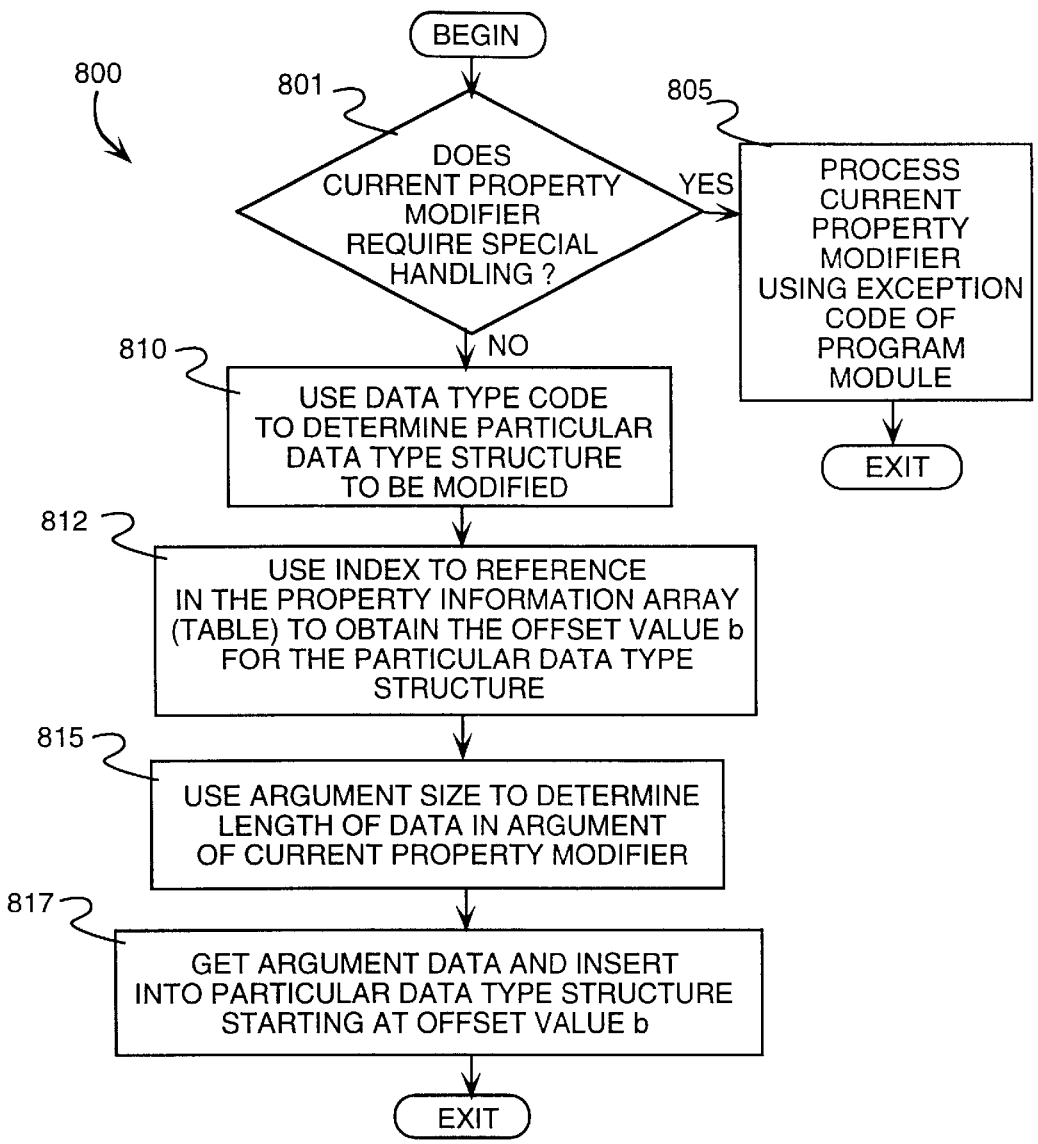
FIG. 8  APPLY CURRENT PROPERTY MODIFIER TO SELECTED DATA

DATA FORMATING PROPERTY MODIFIERS

RELATED APPLICATIONS

The present application is a divisional of non-provisional patent application entitled "Forward Extensible Property Modifiers for Formatting Information in a Program Module", filed on Jul. 16, 1997 and assigned U.S. application Ser. No. 08/893,939 now U.S. Pat. No. 6,016,492.

TECHNICAL FIELD

The present invention relates generally to the field of computer systems, and more specifically relates to providing improved property modifiers operative to format information associated with a computer program and extensible from older to updated versions of the computer program.

BACKGROUND OF THE INVENTION

Word processing computer application programs are a well-known means for processing text information in a computer system. An example of a word processing program is the Microsoft "WORD" program, available from Microsoft Corporation. Many aspects of word processing programs have been extended to other types of computer application programs, for example, spreadsheets, project management programs, graphics programs, database programs, and the like. It is a requirement for these and many other types of computer programs that text, numbers, or other data stored in a document file be displayed in an attractive, formatted manner on a computer monitor, printed via an output device, or otherwise represented.

Many present day computer application programs have the ability to display or output information on output display devices in various formats, often in a form corresponding to the appearance of the data as it will be printed or otherwise output. For example, characters may be printed with any number of fonts, in various sizes, with the characters in boldface, underlined, italicized, centered, in sections, tables, etc.

In many computer application programs, information is represented by a "document". A document is what a user sees and edits. A document can change as the user types, makes formatting changes, adds and deletes text, etc. A document, also called a "document file", comprises a number of different data structures or sections that collectively represent a discrete quantity or unit of data for manipulation with the application program. For example, in a word processing program, a document file typically consists of a header defining file ranges for text and formatting information, a text data structure that stores text-based information, a property modifier structure for storing groups of property modifiers and corresponding arguments or parameters representing formatting information for application to the text, and a format structure containing information for linking the text in the data structure to the groups of property modifiers in the property modifier structure. The property modifiers (and their respective arguments) describe formatting applied to characters, paragraphs, sections, tables, and pictures in the document.

In this prior property modifier structure, formatting information is represented by an 8-bit pointer that constitutes a single property modifier or "sprm". The sprm indicates an offset address within a format "default" table that is stored in conjunction with the executable code of the application program. There is a default table in the executable corresponding to each different type of property, e.g., character, paragraph, table, section and picture. Because the default tables comprise a part of the executable file, they are "permanent" and cannot be modified by the user; these default tables merely serve as reference data containing formatting information that are applied to data items. Each entry in this type of default table consists of an argument size (a "single property argument" or "spra"), a group code (a single property group code or "sgc"), and a special status bit ("fSpec"). The spra indicates the size of parameter value associated with the sprm, which could be a 8-bit byte, a 16-bit word, a 32-bit long, or a variable length array of bytes in the executable. The sgc indicates a type or category of object to be formatted (e.g. character, paragraph, section, etc.). The fSpec status bit indicates whether or not the sprm needs special code to carry out its action.

Each entry in a default table applies a particular single form of formatting to a run of text, in accordance with the type of formatting to be applied, i.e., whether the run of text is a string of characters, a paragraph, a table, etc. In order to apply multiple items of formatting to a selected string of characters, plural sprm entries are provided in the prior property modifier structure. A group of sprm entries indicating a plurality of different formattings applied to a run of characters is indicated as a "group of property modifiers in a list" or "grpprl". Each sprm in a group points to a different entry in one or more of the default tables in the executable.

Turning now to a prior text formatting system used by "Microsoft WORD FOR WINDOWS 95" program, formatting information for an example text run will be examined in detail, as shown in Tables 1, 2 and 3. Table 1 generally describes the formatting for a sample text string, "The quick brown fox jumped over the lazy dog." The typical structure of a document file created in the prior word processing computer program, "Microsoft WORD FOR WINDOWS 95", is shown in Table 2. This document file contains formatting information and the related structures to support the formatting for the text string shown in Table 1. The typical structure of a default format table contained in executable code of the "Microsoft WORD FOR WINDOWS 95" program is shown in Table 3. This table contains default formatting information that supports the formatting for the text string shown in Table 1.

TABLE 1

Text String

The quick brown fox jumped *over* the lazy dogs.
wherein:
    All text is font size 10
    "brown" is bold
    "*over*" is italic and has been made 2 sizes larger
    than the rest of the text

TABLE 2

Document File

| Section | FC Range | Contents | Description/Comments |
|---------|----------|----------|----------------------|
| header  | 0–1FF    | \<header information\> | In this case, data range: 200–22D, format range: 400–42B |

TABLE 2-continued

Document File

| Section | FC Range | Contents | | Description/Comments |
|---|---|---|---|---|
| data structure (text) | 200–209 | The_quick_ | | each character is one byte |
| | 20A–20E | brown | | |
| | 20F–21A | _fox_jumped | | |
| | 21B–21E | over | | |
| | 21F–22D | _the_lazy dogs. | | |
| | 22E–3FF | <unused> | | |
| format structure | | text FC | formatting FC | each FC is a long (4 bytes) |
| | 400–407 | 200 | 600 | |
| | 408–40F | 20A | 604 | |
| | 410–417 | 20F | 600 | |
| | 418–41F | 21B | 60A | |
| | 420–427 | 21F | 600 | |
| | 428–42B | 22E | | (no formatting FC here) |
| | 42C–4FF | <unused> | | |
| property modifier structure | 600–603 | 03 | | count of bytes in 1st grpprl |
| | | 01 | | |
| | | 000A | | sprmCSize (word-size) arg for sprmCSize |
| | 604–609 | 05 | | count of bytes in 2nd grpprl |
| | | 01 | | |
| | | 000A | | sprmCSize (word-size) arg: |
| | | 03 | | size = 10 |
| | | 01 | | sprmCBold (byte-size) arg: bold = on |
| | 60A–611 | 07 | | count of bytes in 3rd grpprl |
| | | 01 | | |
| | | 000A | | sprmCSize (word-size) arg: |
| | | 02 | | size = 10 |
| | | 02 | | sprmCInc |
| | | 04 | | (byte-size) arg: size + = 2 |
| | | 01 | | sprmCItalic (byte-size) arg: italic = on |
| | 612–6FF | <unused> | | |

TABLE 3

Default Format Table

| sprm | sgc | spra | fSpec | b |
|---|---|---|---|---|
| sprmCSize(1) | sgcChp (2) | spraWord (2) | FALSE (0) | 0 |
| sprmCInc (2) | sgcChp (2) | sprByte (1) | TRUE (1) | 0 |
| sprmCBold (3) | sgcChp (2) | spraBit (0) | FALSE (0) | 2 |
| sprmCItalic(4) | sgcChp (2) | sprBit (0) | FALSE (0) | 3 |

Referring first to Table 1, the example text string is "The quick brown fox jumped over the lazy dogs." For this example text string, all text is font size 10, the term "brown" is bold, and the term "over" is italic and is two sizes larger than the remaining portion of the text. Consequently, the formatting attributes for this text string include a 10 point font size, bold, italic, and increased font size (by 2 sizes). These format attributes for the text string of Table 1 are defined in the structures of the document file of Table 2 and supported by the format information maintained in the property information array of Table 3.

Referring now to Table 2, a document file for the prior word processing program contains multiple structures including a header, a data structure, a format structure, and a property modifier structure. The header contains general information regarding the document file and defines the text range and the format information range for the data structure and the format structure. A File Character (FC) position represents an offset from the beginning of the document file. Consequently, the header section of the document file is defined by the FC range of 0–1FF. The text range for text maintained in the data structure is 200–22D. The linking information for linking the data of the data structure to the property modifiers of the property modifier structure is maintained within the format structure at 400–42B. For example, for the FC range of 400–407, the text beginning at FC range 200, "The quick ", is associated with the group of property modifiers within the property modifier structure beginning at the FC range of 600.

In the file shown in Table 2, the formatting is specified using single property modifiers (sprms), also called property modifiers. For this "WORD 95" program example, the relevant property modifiers are directed to the formatting actions of defining a base font size, increasing this font's size, bold, and italic. These property modifiers and their values are listed below:

sprmCSize: character formatting to set font size; Value=1 sprmCInc: character formatting to increase font size; Value=2 sprmCBold: character formatting to make text bold; Value=3 sprmCItalic: character formatting to make text italic; Value=4

Each sprm takes an argument, and multiple sprms and their arguments can define formatting for a piece of text.

Groups of property modifiers in a list, also called a grpprl, are stored in the property modifier structure within the file at FC ranges 600–603, 604–609 and 60A–611. A set of grpprls represents the formatting information for the sample text stream "The quick brown fox jumped over the lazy dogs." For the text "The_quick_", a grpprl at FC range 600–603 contains just one sprm and argument: sprmCSize, with its argument of 10 (because the text is size 10). For "brown", a grpprl at FC range 604–609 contains two sprm/argument pairs: sprmCSize, followed by its argument of 10; and sprmCBold, followed by its argument, TRUE. For "over", a grpprl at FC range 60A–611 contains three sprm/argument pairs: sprmCSize, 10; sprmCInc, 2 (increase size by 2); sprmCItalic, TRUE. Given a sprm of Table 2, the associated values for sgc, spra, fSpec, and b, which are stored in the executable of the application program, can be determined by accessing the default table shown in Table 3.

In prior versions of the Microsoft "WORD" program, sprm's were originally restricted to being byte-size. Because of the desire to keep these sprm values small, the sprms did not directly encode information about what property type was modified (for example, character, paragraph, table, etc.) or the size of the argument following the property modifier. Rather, each property modifier was merely an index into the default tables stored in association with the executable file of the application program that themselves encoded the formatting information.

Referring now to Table 3, a default format table maintained within the executable of the prior word processing program can be accessed by using a sprm value as an index to the table. This format table contains the fields for sgc, spra, fSpec, and b values, which are referenced by a corresponding sprm value. For example, the first entry in the default format table is accessed by the sprmCSize(1). This entry contains the following format-related information: sgc=sgcChp(2); spraWord(2); fSpec=FALSE(0); and b=0.

The "b" value is an offset into a data type structure maintained in dynamic memory and can be used to find the location of a property to modify within that memory structure.

To support an application of the formatting information in the document file of Table 2 and the default table of Table 3, it is necessary to first locate the group of property modifiers associated with the text to be formatted, and then walk or "traverse" the group of property modifiers. For the example of the text "over", this text element is referenced by the FC range 21B–21E in the data structure of the file, as shown in Table 2. The format structure indicates that the particular group of property modifiers for the text starting at FC=21B is located within the property modifier structure at FC=60A. The first byte within this group of property modifiers is "07". This first byte defines the number of bytes in the particular group of property modifiers, i.e., seven bytes follow the byte count. The second byte within this group of property modifiers is "01". This is a sprm value, which can be used to index into the default format table shown in Table 3 to get the spra value, that defines the size of the argument for this property modifier. As shown in Table 3, the spra located at the offset "01" of the default table is "spraWord". The third and fourth bytes are "000A", which is the expected Word-sized argument for the property modifier. The fifth byte within this group of property modifiers, "02", is another sprm value. This sprm value is used to index into the default format table to get the spra value "spraByte". The sixth byte is "02", which is the expected Byte-size argument for this property modifier. The seventh byte, "04", is another sprm value. This sprm value is used to index into the default format table to get the spra value "spraBit". The eighth byte is "01", which is the expected Bit-size argument for the property modifier.

Significantly, if an application program did not recognize a sprm value shown in the file of Table 2, then the program would not be able to determine the size of the sprm argument by accessing the default table in the executable. This would prevent the application program from traversing the property modifier structure because the program would not recognize how to skip over the sprm argument to read the subsequent sprm's and their arguments in the property modifier structure.

With the above-described property modifier approach, a particular problem can arise when programmers are required to add new property modifiers when creating an updated version of the program. Place-holders have been employed in the default tables to reserve space for a predetermined number of property modifiers associated with a particular group code or "sgc". When the preallocated space for property modifiers was exhausted as new modifiers were added, a file format change was required to provide a new mechanism for allocating space for property modifiers-in the default property tables. The file format change often caused documents created with the updated version of the program to be unreadable with prior versions of the program.

In prior versions of the Microsoft "WORD" program, a single 8-bit integer was used as a sprm. The application program used that value to index into the default table stored in association with the program executable. The result gave detailed information about the property, including the size of the parameter indicated by the spra and the object it should be applied to as derived from the sgc (e.g., character, paragraph, section, etc.). The information stored in the default table also included information needed to modify appropriate in-memory structures holding the actual formatting information. These 8-bit sprm integer values were divided into ranges; the range a property modifier was in determined what kind of object was modified indicated by the sgc, e.g., whether character, paragraph, section, table, or picture. As the program was updated, these ranges were periodically adjusted, and it was discovered that numbers were exhausted in some ranges but there were additional values available in other ranges.

When a new property modifier had to be added in a subsequent version of the application program, the old version did not necessarily have the formatting information in its default property file in the executable. Thus, an older version of the application program, if it attempted to open a document created with a newer version of the program, could not determine the size of a parameter or the object that should be formatted, as the file created with the newer version was incompatible with the older version.

In order to allow for backwards compatible changes to the file format, programmers found it necessary to preallocate slots in the default tables in the executable for future expansion. Once a particular version ran out of preallocated slots, it was then necessary to make a file format change—to increase the number of preallocated slots—in order to allow new property modifiers. Of course, this preallocation had to be done presently while the programmers were preparing program code for a prior version even before the programmers were instructed to work on the subsequent version! Needless to say, the foresight of many computer programmers was rarely good enough to preserve document compatibility in subsequent versions of the application program.

Another problem associated with the prior art approach resulted from the addition of new sprm table entries. A prior version of the application program could not handle or operate upon with a document created with a subsequent version of the application program because it did not "know" what to do with new sprm values added. In other words, sprms in the document created with the later version could not be handled by the prior version because there was no program code to handle it.

Furthermore, the prior version could not merely skip over the new values because there was no information indicating how big was the "value" part of the newly added sprm. Although the table entry in the newer version had a spra, the older version did not have a table entry for the new sprm, and therefore could not look up the spra value. Thus, the prior version of the program did not know how many bytes to skip over in the default property table to get to the next sprm. This was because the size of the value—the spra—was encoded in the table in the executable and not stored in the document itself.

Accordingly, there is a need to provide a method and system that enables documents created with a newer version of an application program to be properly handled by prior versions of the application program in a clean and efficient manner, by providing a mechanism for allowing the prior version of the application program to skip over formatting information that it does not handle. This would allow sites that maintain multiple versions of a particular application program to interoperate and share documents with minimum time lost to conversion between various application versions.

SUMMARY OF THE INVENTION

The present invention provides forward-extensible property modifiers for formatting information of a document file in a program module. In particular, the invention entails encoding into the property modifiers items of information that were previously encoded in the default property table(s)

stored in the executable portion of the application program. In accordance with the invention, the argument size (spra), group code (sgc), and special indicator value (fSpec) are now encoded in the property modifier or sprm, leaving additional bits for indexing into a new style default table associated with the executable of the program module. Because the argument size (the spra) is directly encoded in the sprm itself, subsequent versions of application programs employing the invention can add new sprm values that prior versions do not handle but can gracefully skip over.

Computer programs are often revised and updated to add new features and capabilities. Some revisions affect the manner in which formatting is applied to information in the document, and require the addition of new property modifiers from time to time. For example, in prior versions of Microsoft's "WORD" application program, it was not always possible to define new property modifiers in such a way that earlier versions of the "WORD" application program would be able to utilize (or skip, if necessary) property modifiers added after that version. The inability of earlier versions of a program to "understand" or process documents created with later versions of the program results in inconvenience to users and inefficiency in organizations that must support multiple versions of the program and/or multiple platforms.

With the present invention, programmers are afforded more freedom and flexibility for adding new types of properties to future versions of the program module. Advantageously, documents created with newer versions of the program can be read and handled by older versions as well. The older versions may not understand or handle formatting provided by new types of property modifiers, but the older versions will still be able to read documents and interpret properties associated with that particular version. Such older versions can skip over and save values of new properties created with the subsequent versions without loss of formatting created with the subsequent versions of the program. Using the present invention, a document created with a later version of an application program can be processed with an earlier version of the computer program without loss of new formatting property modifiers added in the newer version, and enabling the older version to skip property modifiers it does not understand.

To support the formatting of information manipulated by a program module, the present invention provides an improved structure of a file for use in connection with a property information array stored in association with the program module. The property information array maintains formatting information for application to data in a computer file upon which the program module is operative for manipulating. This information describes how to apply formatting. Formatting is typically applied to a character, paragraph, picture, section, table, etc. The improved file structure can include a header, a data structure, a property modifier structure and a data formatting structure. The data structure is useful for storing data elements, such as text. The property modifier structure stores groups of data formatting property modifiers and their arguments, each group representing the appearance of data elements. The data formatting structure stores linking information that associates the data element with corresponding data formatting property modifiers.

Each data formatting property modifier can include a size field, an index field, a data type code field and a special handling data field. The size field can include information indicating the size of the argument for the data formatting property modifier. The index field contains an index into the property information array associated with the program module. The data type code field contains a data type code indicative of a type of data object for formatting to which the data formatting property modifier applies. The special handling data field contains information indicating whether the data formatting property modifier requires a special handling operation.

For another aspect of the present invention, a computer-implemented method of formatting information uses a property modifier structure having at least one group of property modifiers and corresponding arguments. The property modifier structure is maintained within a file of a program module. This file is typically stored in permanent memory, e.g., hard disk drive or CD-ROM. Each property modifier includes a size field having information indicating the size of its property modifier argument and an index field having an index into a property information array stored in association with the program module. The property information array, in contrast, typically contains information on how to apply formatting for a given property modifier and its argument, and can be stored in the executable portion of the program module.

A group of property modifiers associated with selected information for which formatting is to be applied is located within the file and is traversed by the program module. This traversal of the property modifier group can be accomplished by utilizing the information in the size field of the current property modifier to determine the location of the next data formatting property modifier in the group of data formatting property modifiers. Formatting is applied to the selected information by using the index of each property modifier associated with the selected information to access the formatting information maintained in the property information array.

In view of the foregoing, it will be appreciated that the present invention provides an efficient data structure wherein a property modifier associated with data elements, such as a text run, ca store encoded information corresponding to the type of object to receive the formatting, the size of the property modifier's argument (which follows the property modifier), and an index into the property information array associated with the computer application program executable. Instead of pre-allocating space in the executable portion of a program module, the property modifier itself contains information embedded therein that indicates the size of the parameter of the property modifier. This allows graceful skipping of property modifiers that are not understood by a given version of the program module during a traversal of a property modifier structure in support of an application of formatting to selected information.

These and other features, and advantages of the present invention may be completely understood through the detailed description of the preferred embodiment of the invention provided below and by inspection and review of the accompanying drawing figures.

BRIEF DESCRIPTION OF THE DRAWINGS

FIG. 6 is a logical flow diagram that illustrates the steps of decoding a current property modifier in accordance with an exemplary embodiment of the present invention.

FIG. 7 is a logical flow diagram that illustrates the steps of determining whether a program module can process a current property modifier in accordance with an exemplary embodiment of the present invention.

FIG. 8 is a logical flow diagram that illustrates the steps of applying a current property modifier to selected data in accordance with an exemplary embodiment of the present invention.

DETAILED DESCRIPTION OF THE DISCLOSED EMBODIMENT

The present invention provides forward-extensible property modifiers for formatting text and other information for display, printing, etc., in a module that runs on a computer system program. In one embodiment, the invention is incorporated into a word processing application program entitled "WORD", marketed by Microsoft Corporation of Redmond, Washington. The forward extensibility allows documents created with a later version of an application program to be read and handled by earlier versions of the application program, yet allowing the document to preserve its cross-version readability. Formatting information may be associated with characters, or groups of characters, that are displayed and printed with any number of attributes, such as font size, color, italics, underlining, boldface, indentation, margins, etc. For example, characters or groups of characters may be displayed or printed with character formats such as 12 point, bold and italics, or 9 point, plain, tab-indented, etc. Similarly, selected characters or groups of characters may be displayed with various paragraph borders, colors, tables, etc.

As described above, in prior systems, formatting information was indicated by a single property modifier or "sprm" associated with a run of text. Therefore, each run of text included at least one sprm or format descriptor. In such a prior system, the sprm was merely an index into a table associated with the executable file of the application program. In contrast, the present invention provides an efficient data structure wherein the property modifier associated with a run of text stores information corresponding to the type of object (group data-type code) to receive the formatting, the size of the argument following the sprm (the spra, which can indicate a fixed or variable size of an argument), and an index (ispmd) into the property information array associated with the computer application program executable. Instead of pre-allocating space in the executable portion of the application program, the sprm itself contains information embedded therein that indicates the size of the parameter of the property modifier. This allows graceful skipping of property modifiers that are not understood by a given version of the application program.

Property modifiers constructed as described herein are employed to apply the formatting information to the run of text as it is displayed, printed, etc. Separate computer program elements, not described herein, are utilized to receive the run of text and its applied formatting and to display the same on a display screen or to output the same to an output device such as a printer. For display purposes, when a display screen refresh event occurs in the manner that will be known to those skilled in the art, the text information bearing the formatting information applied thereto are transmitted to an output display device, such as a monitor or a printer.

Figure 1:
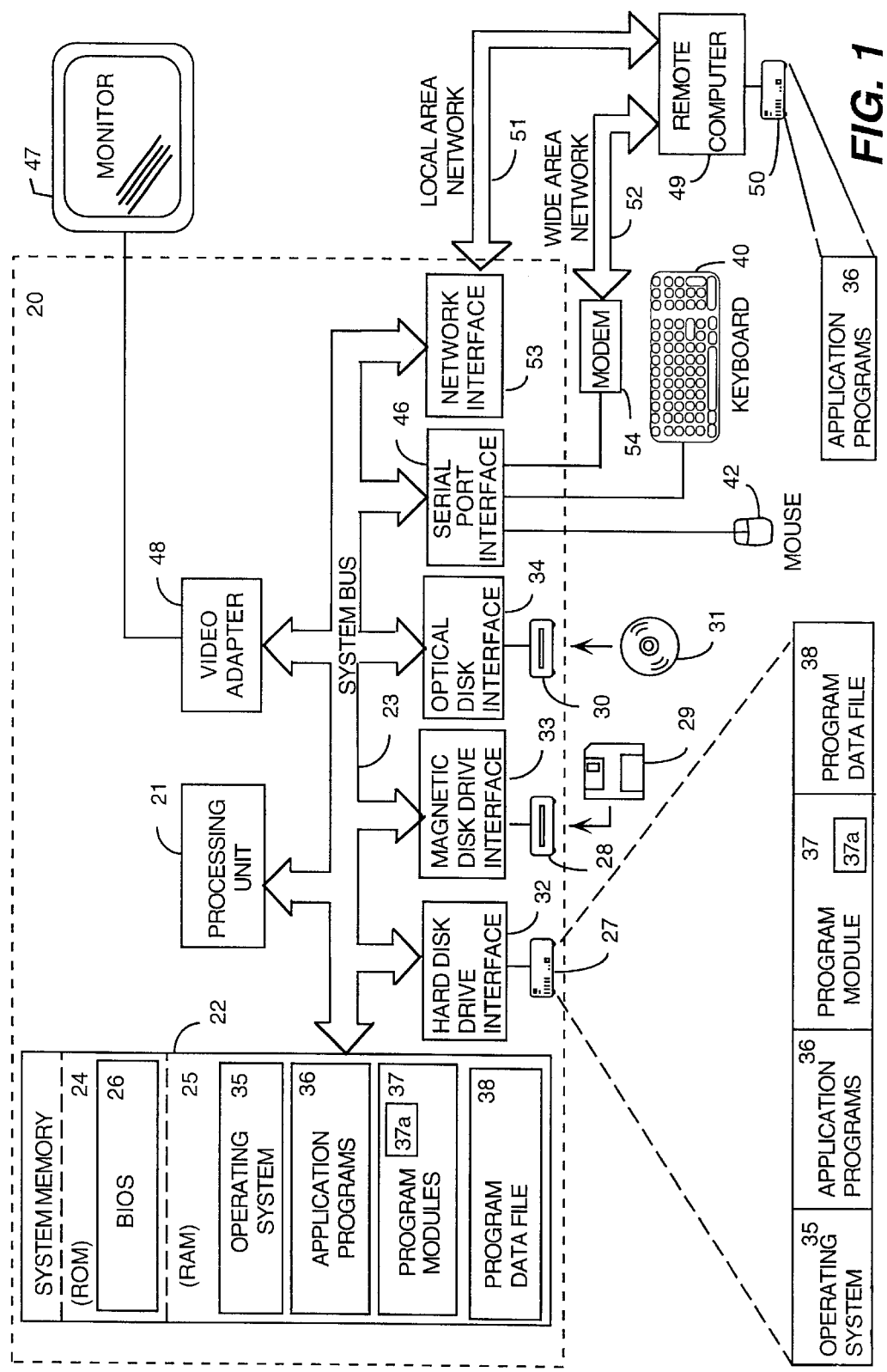
FIG. 1 is a diagram illustrating a representative computing environment for the operation of an exemplary embodiment of the present invention.

Referring now to the drawings, in which like numerals indicate like elements through the several figures, FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processing program module 37, a property information array 37a associated with the executable code of the program module 37, and a program data file 38, such as a document file. The structures of program data file will be described below with respect to FIG. 2. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
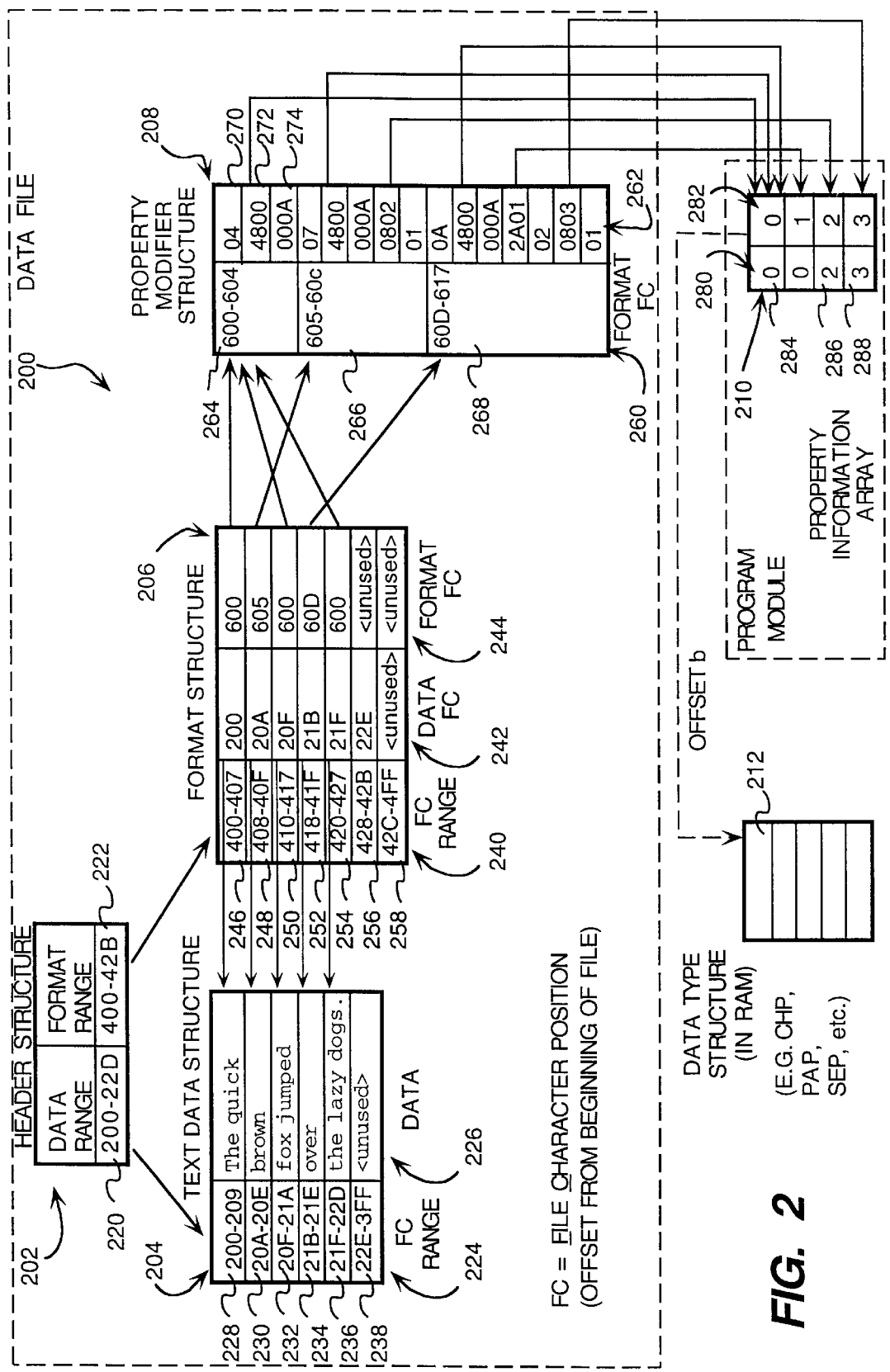
FIG. 2 is a diagram that illustrates the improved structure of a document file and a property information array of a program module in accordance with an exemplary embodiment of the present invention.

FIG. 2 illustrates the improved structure of a file containing groups of forward extensible property modifiers, a property information array maintained in a program module, and a data type structure stored in dynamic memory, in accordance with an exemplary embodiment of the present invention. This exemplary embodiment is particularly useful with a word processing application program, a well-known type of computer application program. A computer system, under the control of the word processing program, is programmed to display data on a display screen such as the computer monitor 47 (FIG. 1) and to modify data in accordance with user commands, such as by typing new characters, applying formatting, printing, selecting characters for editing operations such as deletion, copying, etc. While an exemplary embodiment of the present invention is disclosed in the context of a word processing application program, those skilled in the art will appreciate that the principles of the present invention may be applied to virtually any type of computer program which incorporates formatting or attribute information.

Tables 4, 5, 6, and 7 provide information in table form regarding the improved structure of the file, the property information array, and the data type structure shown in FIG. 2. These tables provide supplemental information to support a detailed explanation of the architecture shown in FIG. 2. To facilitate a review of FIG. 2 and Tables 4, 5, 6, and 7, a representative example of the formatting applied to a selected text string will be examined. Specifically, the text string shown in Table 1, "The quick brown fox jumped over the lazy dogs." is represented by the formatting information maintained in the file, property information array, and data type structure illustrated in FIG. 2 and described in Tables 4, 5, 6, and 7.

Table 4 offers an overview of the information encoded within the values of property modifiers for an exemplary embodiment of the present invention. These property modifiers are directed to aspects of character formatting. Table 5 describes the structures of a document file for use with a program module operable on a computer system in accordance with the exemplary embodiment. Table 6 describes format information maintained within a property information array associated with the program module and accessible by use of an index encoded within a property modifier value. Table 7 describes a data type structure maintained within dynamic memory for storing formatted information to be displayed to a user via an output display device, such as a monitor or a printer.

It should be noted that conventional hexadecimal notation is used throughout this description, the tables and in the drawing figures, e.g., N indicates a 4-bit value and NN indicates an 8-bit value, where N is either 0, 1, 2, 3, 4, 5, 6, 7, 8, 9, A, B, C, D, E, or F.

TABLE 4

Property Modifiers

| Name | spra (3 bits) | sgc (3 bits) | fSpec (1 bit) | ispmd (9 bits) | value (binary) | value (hex) |
|---|---|---|---|---|---|---|
| sprmCSize | spraWord (2) | sgcChp (2) | FALSE (0) | 0 | 010 010 0 000000000 | 4800 |
| sprmCInc | spraByte (1) | sgcChp (2) | TRUE (1) | 1 | 001 010 1 000000001 | 2A01 |
| sprmCBold | spraBit (0) | sgcChp (2) | FALSE (0) | 2 | 000 010 0 000000002 | 0802 |
| sprmCItalic | spraBit (0) | sgcChp (2) | FALSE (0) | 3 | 000 010 0 000000003 | 0803 |

TABLE 5

Document File

| Section | FC Range | Contents | Description/Comments |
|---|---|---|---|
| header | 0–1FF | <header information> | In this case, data range: 200–22D, formatting table: 400–42B |
| data structure | 200–209 | The_quick_ | each character is one byte |
| | 20A–20E | brown | |
| | 20F–21A | _fox_jumped_ | |
| | 21B–21E | over | |
| | 21F–22D | _the_lazy_dogs. | |
| | 22E–3FF | <unused> | |

TABLE 5-continued

Document File

| Section | FC Range | Contents | | Description/Comments |
|---|---|---|---|---|
| format structure | | text FC | formatting FC | each FC is a long (4 bytes) |
| | 400–407 | 200 | 600 | |
| | 408–40F | 20A | 605 | |
| | 410–417 | 20F | 600 | |
| | 418–41F | 21B | 60D | |
| | 420–427 | 21F | 600 | |
| | 428–42B | 22E | | (no formatting FC here) |
| | 42C–4FF | <unused> | | |
| property modifier structure | 600–604 | 04 | | count of bytes in first grppr1 |
| | | 4800 | | sprmCSize |
| | | 000A | | (word-size) arg for sprmCSize |
| | 605–60C | 07 | | count of bytes in second grppr1 |
| | | 4800 | | sprmCSize |
| | | 000A | | (word-size) arg: |
| | | 0802 | | size = 10 |
| | | 01 | | sprmCBold (byte-size) arg: bold = on |
| | 60D–617 | 0A | | count of bytes in third grppr1 |
| | | 4800 | | sprmCSize |
| | | 000A | | (word-size) arg: |
| | | 2A01 | | size = 10 |
| | | 02 | | sprmCInc |
| | | 0803 | | (byte-size) arg: |
| | | 01 | | size + = 2 sprmCItalic (byte-size) arg: italic = on |
| | 618–6FF | <unused> | | |

TABLE 6

Property Information array

| index (ispmd) (from sprm value) | b |
|---|---|
| 0 (sprmCSize) | 0 |
| 1 (sprmCInc) | 0 |
| 2 (sprmCBold) | 2 |
| 3 (sprmCItalic) | 3 |

TABLE 7

Data Type Structure

| address | name | contents |
|---|---|---|
| 00–01 | fontSize | word-size value indicating font size |
| 02 | bold | TRUE or FALSE |
| 03 | italic | TRUE or FALSE |

Turning now to FIGS. 1 and 2 and Tables 4, 5, 6, and 7, a format system 200 includes a program data file 38 that can be manipulated by a program module 37 having a property information array 37a residing within executable code. The data file 38 comprises multiple structures, including a header structure 202, a data structure 204, a format structure 206, and a property modifier structure 208. The property information array 37a comprises a table 210 containing handling information for applying formatting information to text maintained within the data file 38. A data type structure residing in dynamic memory, such as the RAM 25, contains formatting for the data represented by the data file.

As shown best in FIG. 2 and Table 5, the header structure 202 contains header-related information maintained within the file character position (FC) range 0–1FF of the data file 38. The header information includes a definition of the ranges for data, typically text, and format link information in the data file 38. Specifically, a data range 220 defines the text range, in this case, the FC range 200–22D. A format range 222 defines the range for format link information, in this case, the FC range 400–42B. Those skilled in the art will appreciate that other information regarding the data file and its structures can be stored within the header structure 202.

The data structure 204 contains text-related information within multiple entries 228, 230, 232, 234, 236, and 238. In general, the data structure 204 comprises text-related data 226 and a designation of the FC ranges 224 corresponding to the data 226. In particular, each entry of the data structure 204 comprises text-related data referenced by a particular FC range. For example, the entry 228 contains the text "The quick " at the FC range 200–209. Each character of the data 226 maintained in the data structure 204 has a one byte length. Consequently, for the entry 228, the text "The quick" comprises ten characters (including the space between "The" and "quick " and the space after "quick") represented by ten bytes of the data file 38.

The format structure 206 maintains linking information that links the data 226 of the data structure 204 to the groups of property modifier within the property modifier structure 208. The format structure 206 contains data link information 242 and format link information 244, both referenced by a format FC range element 240. The format structure 206 comprises multiple entries, specifically, entries 246, 248, 250, 252, 254, 256, and 258. Focusing upon the entry 246, this entry indicates that the data starting at the FC range 200 ("The quick") is associated with a particular group of property modifiers maintained with the property modifier structure 208 at the FC range of 600. The entry 246 is maintained within the format structure 206 at the FC range 400–407. The relationship of the entry 246 to the data structure 204 and to the property modifier structure 208 is indicated by the arrow extending from the data link information (200) to the entry 228 and the arrow extending from the format link information (600) to a particular property modifiers group 264. It will be appreciated that a group of property modifiers within the property modifier structure 208 can be referenced by more than one entry within the format structure 206.

The property modifier structure 208 contains groups of property modifiers in a list (grpprls) 262 referenced by a format FC range element 260. For the example shown in FIG. 2, the property modifier structure 208 comprises three groups of property modifiers, specifically a first group 264, a second group 266, and a third group 268. Each of the groups 264, 266, and 268 can contain multiple entries of property modifier-related information referenced by a particular FC range. For example, the first group of property modifiers 264 comprises the entries 270, 272, and 274 referenced by a particular FC range, namely 600–604. As will be described in more detail below with respect to FIG. 3, a group of property modifiers typically comprises a byte count defining the number of bytes within the group, one or more property modifiers or sprms, and an argument or parameter corresponding to each property modifier within the group.

For the first group 264, a byte count 270 is defined by the value "04", a property modifier 272 is represented by the value "4800", and an argument 274 of the property modifier 272 has a value "000A". As will be described in more detail with respect to FIG. 4 and Table 4, each value for a property modifier, such as the property modifier 272, represents encoded formatting information, specifically an argument size, a data-type code, a special handling code, and an index. The index is useful for accessing the property information array 210 maintained within the executable code of the program module 37. For example, the property modifier 272 includes an index that references the first entry of the property information afray 210, namely an entry 284.

Figure 3:
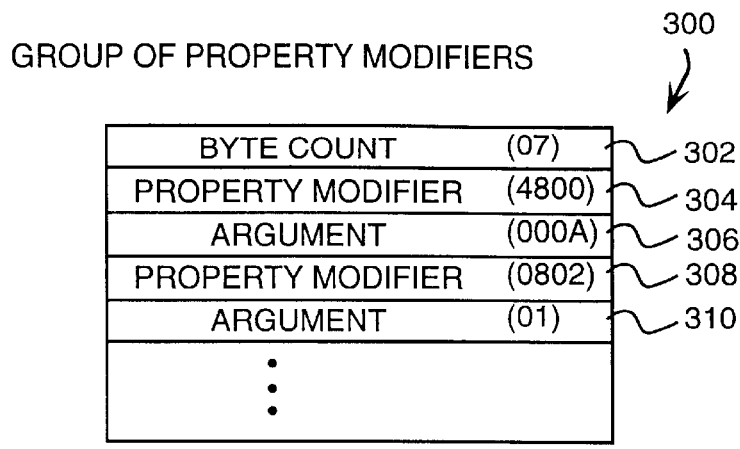
FIG. 3 is a diagram that illustrates a structure for a group of property modifiers in accordance with an exemplary embodiment of the present invention.

Turning to FIG. 3, a representative example of the structure for a group of property modifiers 300, also described as a grppl, will now be described. The group of property modifiers 300 can comprise multiple entries, including a byte count, one or more property modifiers, and an argument for each of the property modifiers. For the group of property modifiers 300, the byte count is maintained in the entry 302, and is followed by a first property modifier 304 and its argument 306 and a second property modifier 308 and its argument 310. The byte count 302 defines the number of bytes within the group of property modifiers 300. Both the first and second property modifiers 304 and 308 represent encoded formatting-related information, as will be described below with respect to FIG. 4 and Table 4. The arguments 306 and 310, also described as parameters or attributes, immediately follow their respective property modifiers 304 and 308. Although FIG. 3 illustrates a group of property modifiers 300 including only two property modifiers 304 and 308 and their respective arguments 306 and 310, those skilled in the art will appreciate that this group of property modifiers can include additional property modifiers and corresponding arguments. For example, a typical text string is represented by multiple formatting attributes, as evidenced by the example text shown in Table 1. Consequently, each group of property modifiers typically contains more than one property modifier and its corresponding argument.

The byte count 302 represents a count of the total number of bytes for property modifiers and their arguments within the group of property modifiers 300. It will be appreciated, however, that this byte count mechanism can be implemented by alternative count techniques that are not dependent upon a byte count. For example, a count of words (where a word is two bytes) can be used to designate the number of words represented by the property modifiers and their arguments in a group of property modifiers. Alternatively, the byte count 302 can be effectively replaced by terminating the group of property modifiers with a special property modifier value, or with a flag in the property modifier, similar to a "special handling" code.

Figure 4:
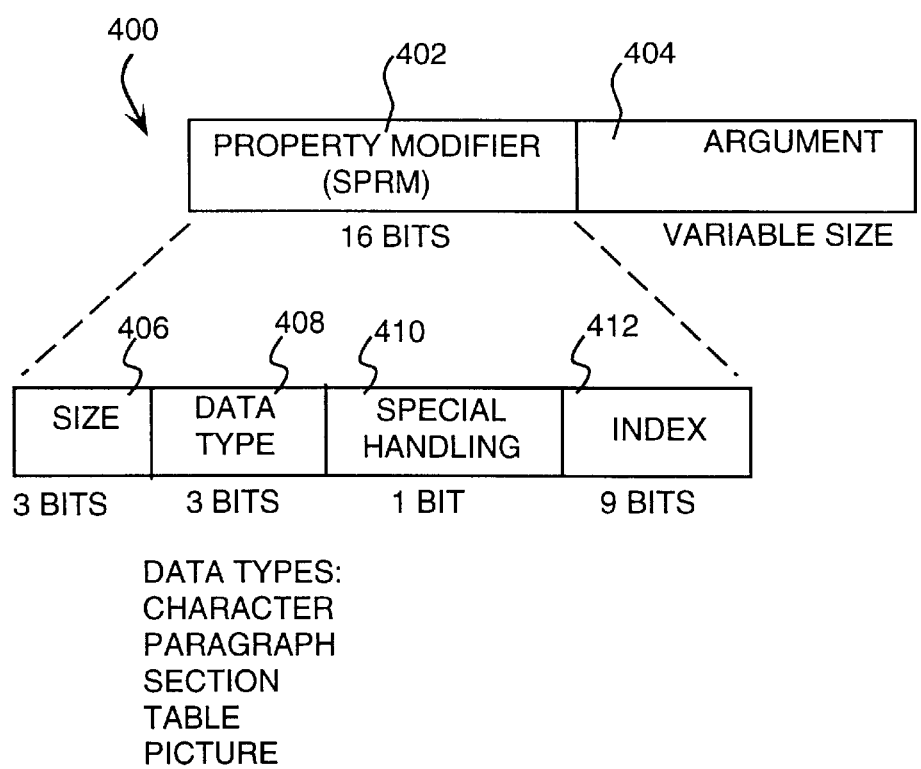
FIG. 4 is a diagram that illustrates a structure for a property modifier in accordance with an exemplary embodiment of the present invention.

Turning next to FIG. 4 and to Table 4, a property modifier-related structure 400 comprises a property modifier 402, also described as a sprm, and its related argument 404. The property modifier-related structure 400 represents a portion of the property modifier-related values maintained within a group of property modifiers, such as the first group of property modifiers 264. The property modifier 402 preferably has a fixed length of 16 bits (bit positions, 0–15), whereas the argument 404 can have either a fixed or variable size. The property modifier 402 contains encoded formatting-related information in multiple fields, including a size field 406, a data type field 408, a special handling field 410, and an index field 412. For the example set forth in Table 1, the property modifier 402 can be represented by one of four different property modifier values, as listed in Table 4. Specifically, the property modifier values can be sprmCSize, sprmCInc, sprmCBold, and sprmCItalic. SprmCSize has a value 4800, sprmCInc has a value 2A01, sprmCBold has a value 0802, and sprmCItalic has a value 0803. These hex values can be converted to binary values, which represent formatting information contained within the fields 406, 408, 410, and 412 of the property modifier 402.

The size field 406 defines the size of the argument for the property modifier 402, namely the size of the argument 404. The size field 406 of FIG. 4 is represented in Table 4 by the single property argument (spra) field. For example, the sprmCSize has a three-bit spra representing a spraWord, as defined by the first three most significant bits of the decoded binary value of this property modifier (bit positions 13–15). The data type field 408 contains a data type code indicative of a type of data object for formatting the data maintained within the data type structure. For example, the data type code indicates whether the formatting is related to a particular type of formatting, such as. character, paragraph, section, table, and picture. As shown in Table 4, the data type field 408 corresponds to the three-bit sgc field of a sprm. For example, for ie sprmcsize, the data type code or sgc is represented by sgcChp. This sgc has a value of 2, as evidenced by the second set of three bits for the decoded binary value of the sprmCSize (bit positions 10–12).

The special handling field 410 comprises information indicating whether the property modifier 402, requires a special handling operation. This information is typically a flag that determines whether the property modifier should be handled by special exception code outside of normal processing operations by the program module 37. The special handling field 410 shown in FIG. 4 corresponds to the fSpec field shown in Table 4 and can have either a FALSE value or a TRUE value. The FALSE value is designated by a logical 0 value within bit position 9 of the decoded binary value for the property modifier. In contrast, the TRUE value is defined by a logical 1 within bit position 9 of the decoded binary value for the property modifier. For the example shown in Table 4, the property modifier sprmCSize has a special handling or fSpec value of FALSE.

The index field 412 comprises the remaining 9 bits of the 16 bits allocated to the property modifier 402 and can include an index into the property information array 210 associated with the program module 37. The index field 412 shown in FIG. 4 corresponds to the ispmd field of a sprm value in Table 4. The ispmd or index field contains a value defined by bit positions 0–8 of a decoded binary value for a property modifier. For example, for the sprmCSize, the ispmd or index field contains a value of 0.

In view of the foregoing, it will be appreciated that a property modifier for the exemplary embodiment of the present invention includes encoded information to support the formatting of data elements of a data file. This encoded information can include a property modifier argument size; a code designating which type of data type structure to be modified; a Boolean flag indicating whether special handling is necessary; and an irndex which uniquely determines which piece of exception or special handling code needs to run, or which is an index into an array for supporting a determination of format handling information so that general purpose code can carry out the action of the property modifier.

Although the exemplary property modifier includes the data type code field 408, one skilled in the art will appreciate that this field may not be necessary for certain specific applications. For example, a data type code field would not required if only a single data type structure, such as a memory structure for character formatting, is used to support the formatting of information in a file. Alternatively, the data type code can be inferred by using the index to access a field in the property information array.

Likewise, one skilled in the art will appreciate that the special handling field 410 may not be necessary for certain specific applications of a property modifier. For example, if all of the property modifiers require processing by special exception code, there would be no need to set a special handling flag to designate the use of special handling code to process these property modifiers. A similar rationale is applicable if none of the property modifiers require processing by special exception code, i.e., all property modifiers can be handled with the general purpose code of the program module after looking up specific information by use of the index.

At least some portion of the exemplary property modifier operates to uniquely identify a specific action to be completed by the program module when applying that modifier. This unique identifier portion can be an index, such as the ispmd, into an array, or it could be an element from a set of distinct values that is used by the program module to identify and carry out a specific action specified by the property modifier, e.g., array lookup, switch statement, repeated if-then-else clauses. Consequently, it will be understood that the index field 412 contains information that is used by the program module to identify and carry out a known operation specified by this information.

One skilled in the art will appreciate that the index field 412 may not be necessary for certain specific applications of a property modifier. For example, the index field would not be required if the program module includes special code that handles the unique identifier of the property modifier via by an iterative comparison technique rather than a program information array lookup. A series of if-then-else statements could be used to dispatch each property modifier to the special code that carries out its action.

Returning again to FIGS. 1 and 2 and referencing Tables 5, 6, and 7, the property information array 210 comprises multiple entries of information for handling the property modifiers and is maintained within the executable code of the program module 37. The property information 210 can be represented by the exemplary information shown in Table 6. Each entry 284, 286, and 288 comprises an offset value "b" 280 referenced by an index or "ispmd" 282 of a property modifier. The offset value, shown as a "b" value in FIG. 2 and Table 6, is useful to identify an offset into a data type structure 212 maintained within dynamic memory, such as the memory 25 of the computer 20. The "b" offset 280 is useful for finding the location within the structure 212 of data type formatting to modify in response to a display command. In particular, the argument of a property modifier having an index 282 pointing to a particular b offset value 280 within the property information array 210 can be inserted within the structure 212 based on the value of the b offset. For the example of a character property, the structure 212 can include the representative information shown in Table 7, and is useful for holding format property information, such as character formatting for text-related data.

It will be appreciated that the action to be conducted by each property modifier value should be encoded as part of the program module. The "property information array" represents an efficient mechanism for encoding this format handling information. Those skilled in the art will appreciate that alternative encoding techniques can also be used to support other implementations of the present invention.

To apply formatting information to a text string referenced in the data file 38 in response to a display command, the program module 37 accesses the data file 38 maintained on the hard disk drive 27 and determines where the particular group of property modifiers corresponding to the text to be formatted is maintained within the property modifier structure 208. The program module 37 can locate s this particular group of property modifiers by accessing the linking information maintained within the format structure 206, which contains information linking text elements to formatting information associated with specific groups of property modifiers. In response to locating the particular group of property modifiers within the property modifier structure 208, the program module 37 can then traverse or otherwise "walk" the structure defining the particular group of property modifiers to obtain the property modifier values and their arguments.

Because information necessary to traverse the group of property modifiers is encoded within each property modifier, the program module 37 can traverse the particular group even if a property modifier value is unknown to the application program. In particular, an application program can decode each property modifier to determine the size of the argument for that property modifier. If the application program does not recognize the property modifier value, the application program can use the argument size to skip past the unknown property modifier and its argument to move to the next property modifier within the particular group of property modifiers. This represents a significant improvement over prior applications of property modifiers and their related structures.

The operation of traversing a particular group of property modifiers will now be described with reference to FIG. 2 and Table 4. For the example shown in Table 1, the text "over" is referenced by the FC range 21B–21E within the text data structure 204, i.e., the entry 234. The format structure 206 indicates that the particular group of property modifiers for the text starting at FC=21B is located within the property modifier structure 208 at FC=60D. The group of property modifiers starting at FC=60D is represented by the entry 268 within the property modifier structure 208. The first entry within the group of property modifiers 268 is the byte count, which defines the number of bytes (0A) within this particular group. Continuing to traverse the group of property modifiers 268, the second entry is a property modifier value "4800". In response to decoding this value, the argument size for the argument associated with this property modifier can be obtained. In particular, the three most significant bits of the decoded binary value define the argument size in this case, value=2 (bytes) or spraWord, which indicates that the argument is one word (2 bytes long). Armed with the knowledge of the argument size, the third entry within the group 268 now can be accessed, which is the word-sized argument "000A" that is expected based upon the decoded information of the property modifier. The fourth entry within the group 268 is another property modifier value, "2A01." Again, the 3 most significant bits of the decoded binary value for the property modifier are examined to determine the argument size, in this case, value=1 or spraByte, which indicates that the argument is one byte long. The fifth entry within the group "02" 268 is then accessed, which is the byte-sized argument that is expected based upon the review of the decoded information of its property modifier. The sixth entry within the group 268 is another property modifier value, "0803". Again, by examining the decoded information of this property modifier value, the argument size can be determined. For this property modifier, the argument size is value=0 or spraBit, which indicates to expect a single bit set in a byte-sized argument. In turn, the argument "01" is accessed. This is the final entry within the group 268 based upon the byte count contained in this group. In this manner, the group 268 is traversed to obtain the formatting information represented by the property modifiers and their arguments for the term "over".

It will be understood that the formatting information associated with a property modifier can be applied to a selected text element as its corresponding group of property modifiers is traversed by the program module. Referring again to the example of the text element "over" in Table 1, the special handling code (fSpec) is obtained in response to decoding the first property modifier of the group 268, the property modifier value "4800". As shown in Table 4, for the property modifier value "4800", the fSpec value is 0, i.e., the FALSE state. This indicates that the program module can operate upon the property modifier value without accessing special handling or exception code. Next, the program module accesses the data type code field of the decoded property modifier value "4800" to obtain the data type code for this property modifier. In this case, the data type code, also described as the sgc value, indicates that the type of data object for formatting to which the property modifier applies is "character formatting". Specifically, Table 4 indicates that the sgc field for the property modifier value "4800" is sgcChp, which represents character-type formatting. Consequently, the character property-data type structure maintained in dynamic memory will be modified as a result of processing this particular property modifier. Table 7 represents the contents of this character property data-type structure.

The index of the property modifier "4800" is then obtained and used to index into the property information array 210 within the executable of the program module 37. This index, also referred to as "ispmd" in Table 4, has a value=0 for the property modifier having a value of "4800". As shown in Table 6 and in FIG. 2, the index for this property modifier references the first entry within the property information array 210 to access the "b" offset value=0. In this manner, a reference to the value to be modified within the character formatting structure in dynamic memory is identified by accessing the property information array.

Next, the argument size is obtained from the decoded property modifier value "4800" to determine the argument size for this property modifier. In this case, as shown in Table 4, the argument size for the property modifier value of "4800" is spraWord, or two bytes. Armed with the size of the argument for the property modifier, the argument is accessed to obtain the value "000A". This argument or parameter is placed within the data type structure 212 in dynamic memory, starting at the "b" offset value=0. This operation replaces the prior value at this offset within the data-type structure. Table 7 indicates that the contents at the address 00 within the character property (CHP) structure are modified by this operation.

Continuing now with the next property modifier within the group 268, the second property modifier has a value of "2A01". This property modifier is decoded to obtain the special handling value, the data type code, the argument size, and, if required, the index. For the property modifier value "2A01", the special handling code is set to a value=1, or the TRUE state, as shown in Table 4. Because the special handling code is set, the program module must handle this particular property modifier with special handling or exception code. Next, the argument size is determined by obtaining the information from the argument size field. As shown in Table 4, the argument size for the property modifier value "4800" is value=1, or spraByte, i.e., the argument is a byte long. In response to obtaining the argument size, the argument is accessed by reading the next byte within the group of property modifiers 268, namely the argument value "02". This argument value will be used to modify the appropriate data-type structure in dynamic memory to modify the formatting for the selected text "over". Specifically, the special handling code of the program module is programmed to conduct a predetermined operation in response to obtaining this particular property modifier value. In this case, the exception code will add the argument value "02" to the "fontSize" value shown in Table 7.

In turn, the third and final property modifier within the group of property modifiers 268, the property modifier having a value "0803", is obtained and processed in a manner similar to that described above for the first property modifier having a value "4800".

It will be appreciated that formatting information not known to a particular version of a program module (as defined by property modifiers and their arguments) can be preserved when the program module resaves a data file, thereby creating a "new" data file. For example, during a file save operation, the data type structure maintained in memory, such as the character property-data type structure, can be used to support the generation of a group of property modifiers and arguments, i.e., a grpprl, in the property modifier structure of the new data file. The old grpprls are then read from the original data file, and any property modifiers and arguments previously skipped as unknown are identified to preserve them in the new data file. The program modules know which property modifiers and corresponding arguments to select from the original data file based on information encoded within the property modifiers, i.e., whether data type codes (sgc) match, and whether the index (ispmd) is out of range.

Figure 5:
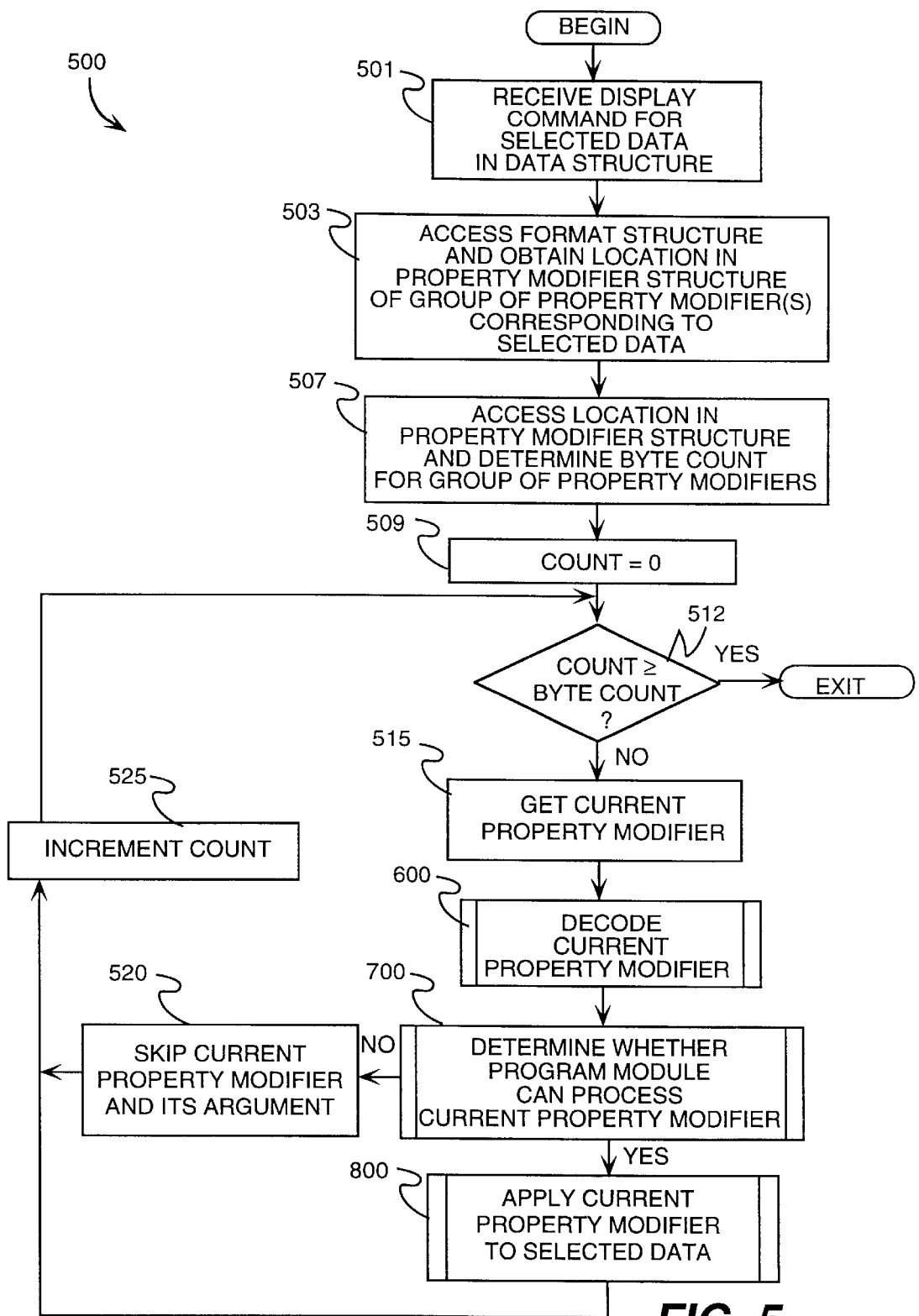
FIG. 5 is a logical flow diagram that illustrates a computer-implemented method for formatting information in accordance with an exemplary embodiment of the present invention.

Refer now to FIG. 5 for a discussion of the computer-implemented processes involved in making and using the present invention. These processes are carried out as code within the executable program module 37 running on the computer system 20. The process 500 illustrated in FIG. 5 carries out general operations that are responsive within the context of a computer application program to a display command for selected data. Operations are conducted to obtain the appropriate formatting information from the appropriate data structures as described herein, and to apply such formatting information so as to obtain formatted information for display on the computer system's monitor or printing via an output device. It will therefore be understood that the processes described in connection with FIG. 5 and the associated sub-processes execute as a part of the executable program module 37, and that other parts of the executable program module that do not form a part of the present invention will not be described, as such conventional operations are within the abilities of the skilled artisan.

Starting at step 501, the first step taken is to receive a display command for selected data in the data structure. Such a display command will be received in response to several types of events. For example, a display command will be received upon initialization of the executable program module and a determination by parts of the program to display selected portions of a data file with data elements on the display screen upon loading of a document. Similarly, such a display command will be received in response to a user command to scroll within a word processing document such that additional data elements are rolled onto screen. Such a display command will also be received in response to a command to expand or reduce the view of a certain document so as to cause display of more data elements in a smaller size or fewer data elements in a larger size. Other examples of the display command will occur to those skilled in the art.

In response to receipt of the display command at step 501, the particular selected data elements within the data structure that are to be displayed are retrieved from the data structure that stores the data elements. Such data elements are now ready to be formatted for display.

At step 503, the data formatting structure is accessed to obtain the location in the property modifier structure in which is stored a group of property modifiers (grpprl) that corresponds to the selected data elements. For example, this entails following the pointer 600 in the format structure 206 to the property modifier 600–604 in the property modifier structure 208 in FIG. 2, so as to access one or more property modifiers associated with the selected text.

At step 507, the property modifier structure is accessed at the appropriate pointer value and the particular property modifier group at that location within the structure is examined to determine the byte count for the group of property modifiers. It will recalled from prior discussion that one or more property modifiers can be applied to a selected data element for display. A determination of the byte count for the group of property modifiers allows the group of property modifiers to be traversed as a list so that each property modifier in turn may be applied to the selected data elements.

At step 509, a temporary counting variable Count is initialized to zero to provide a mechanism for traversing the data within the group of property modifiers. Control then passes to decision 512.

At decision 512, the inquiry is made whether the temporary variable Count is greater than or equal to the byte count obtained in step 507. If so, the YES branch is taken, and the routine 500 exits. The routine exits at this point because the entire group of property modifiers associated with these selected text has been processed and control should then be returned to other parts of the calling process.

If in decision 512 there are additional bytes remaining to traverse within a group of property modifiers, the NO branch is taken to step 515.

At step 515, the current property modifier is obtained from within the property modifier structure, as indicated by the present byte count. Control passes to routine 600.

Routine 600 carries out steps for decoding the current and selected property modifier within the group of property modifiers. Steps for the routine 600 are discussed in connection with FIG. 6. The routine 600 returns information contained in the fields of the selected property modifier for use in subsequent processing. In particular, routine 600 returns the size of the argument of the property modifier, the data type code, the special handling code, and the index, all as described in connection with FIG. 4 and Table 4. These values are utilized in routine 700. Upon a return with these values, routine 600 passes control to routine 700.

Routine 700 determines whether the calling program module is able to process the current property modifier. Steps for carrying out routine 700 are described in connection with FIG. 7. It will be recalled from discussion earlier that a principal objective of the present invention is to provide a mechanism whereby a data file created with a particular version of program module can skip over property modifiers that it does not recognize and cannot handle. In the present invention, the provision of the size field within the data formatting property modifier indicates the size of the argument for the data formatting property modifier. In the event that the program module cannot understand or handle the property modifier presently being examined, the system can readily skip over the data bytes of the property modifier and access the next property modifier for processing.

If a determination is made that the program module process cannot handle the present property modifier being examined, the routine 700 will return a negative parameter, which will follow the NO branch to step 520. At step 520, the current property modifier and its argument are skipped because the program module process cannot process the property modifier and apply the formatting associated therewith. Control then passes from step 520 to step 525.

At step 525, the temporary variable Count is incremented by a number corresponding to the size of the property modifier (typically 2 bytes) and the number of bytes from the argument of the property modifier being examined, and control passes back to decision 512 described above. Further bytes associated with the group of property modifiers are then examined or the routine 500 exits.

Returning to routine 700, if the program module process is determined to be capable of processing the current and selected property modifier, a positive parameter will be returned and the YES branch will be taken to routine 800. Steps associated with routine 800 are described in connection with FIG. 800.

In routine 800, the current and selected property modifier is then applied to the selected data elements so that the formatting can be displayed appropriately. FIG. 8 returns upon completion of this task of applying formatting, and control passes to step 525 where the temporary variable Count is incremented by the number of bytes associated with the just-applied property modifier and its argument.

FIG. 6 illustrates steps of the routine 600 for decoding a current and selected property modifier. Starting at step 601, the first action taken is to obtain the size of the argument of the property modifier from the size field. From the discussion above, it will be recalled that the size field in the property modifier is three bits and allows a preferred determination of the size of the argument (spra) of the property modifier. At step 605, the data type code (sgc) is obtained from the data type code field. This is also three bits, as described in connection with FIG. 4 and Table 4. At step 607, the special handling code (fSpec) is obtained from the special handling field, if appropriate. Finally, at step 610, the index (ispmd) is obtained from the index field, which is utilized to access into the property information array in the program module of FIG. 2. Once these parameters are obtained from the current and selected property modifier, the routine 600 exits, returning these parameters for utilization by other processes, as described in connection with FIG. 5.

FIG. 7 illustrates the steps associated with the routine 700, for determining whether the program module can process the current and selected property modifier. Starting at decision 701, an inquiry is made whether the data type code (three bits) of the current property modifier matches a data type associated with the display command. It will be recalled from prior discussion that the program module that issued the display command (step 501 in FIG. 5) can be that of various types, such as display character, display paragraph, display section, etc.) It will also be recalled that there is a data-type code (sgc) indicative of the particular type of data presently being formatted upon application of a selected property modifier. In the event that the data type code does not match a data type associated with the display command, the NO branch is taken and the routine 700 exits, passing a NO parameter back to the calling routine. If the data type code does match one the data types associated with the display command, the YES branch is taken to decision 705.

At decision 705, the inquiry is made whether the index (nine bits) of the currently examined property modifier is within a range recognized by the calling program module. It will be recalled from prior discussion that each particular version of a computer program typically is constructed to provide a predetermined range of indexes into its property information array. If the index is for some reason outside the range of that recognized by the program module, it is an indication that the calling program module cannot process the property modifier being examined. In this case, the NO branch is taken, and a NO parameter is returned as the routine 700 exits. If at decision 705 the index is within the recognized range, the YES branch is taken, and a YES parameter is returned as the routine 700 exits and returns control to the calling process. In particular, control is passed to process 800 as shown in FIG. 5.

FIG. 8 illustrates the steps of a routine 800 for applying a selected and current property modifier to the selected data items in the data structure. Starting at decision 801, the inquiry is made whether the selected and current property modifier requires special handling. This inquiry is made based on the state of the special handling code (fSpec). If so (fSpec=TRUE), the YES branch is taken to step 805. At step 805, the current and selected property modifier is processed using exception code of the program module. It will be recalled from prior discussion that the special handling code indicates the presence of special processing code associated with the program module that is employed to carry out the formatting in circumstances for special handling. Upon completion of the exception code execution, the process 800 exits.

Returning to decision 801, if fSpec is FALSE, the NO branch is taken to step 810. At step 810, the data type code (sgc) of the property modifier is employed to determine the particular type of data structure which is to be modified (e.g., a character data type structure (CHP), a paragraph properties structure (PAP), a section property structure (SEP), etc.), and control then passes to step 812. At step 812, the nine-bit index of the current and selected property modifier is employed to reference in the property information array associated with the program module (210 in FIG. 2). The index provides an offset within the property information array so as to obtain the value of the "b" offset value.

It will be recalled that the appropriate structure for storing the character formatting for the particular type code, such as a CHP, is indexed by the value of the "b" offset in the property information array, and that this particular data type structure (e.g., CHP) is stored in a temporary workspace in RAM. Control then passes to step 815.

In step 815, the argument size of the property modifier (three bits) is employed to determine the length of the data in the argument portion of the property modifier presently being examined. Then, in step 817, the argument data of the current and selected property modifier is employed and inserted into the particular data type structure (e.g., CHP, PAP, etc.), starting at the "b" offset value obtained at step 812. The result is to replace or write over the values in the data type structure, thereby creating a modified data type structure that contains the formatting information that is to be applied to the selected data elements.

The end result is the modification of the data type structure stored in temporary workspace to contain appropriate formatting information so that the selected data elements upon display, printing, etc. have applied thereto appropriate formatting properties to achieve the desired formatting result. Upon completion of step 817, the process 800 is complete and the particular data type structure associated with the property modifier being examined is complete. Process 800 then returns, and further steps would follow execution of process 800 are carried out (FIG. 5).

Advantageously, the present invention provides a formatting method and system that allows a particular earlier version of a computer application program such as a word processor to handle a document created with a later version of the word processing computer application program that may contain property modifiers added after creation of the earlier version. The invention allows the earlier version handling such a document to skip to property modifiers that it is not programmed to handle. Furthermore, the earlier version of the program is still able to preserve the property modifiers introduced into the document by the later version by merely skipping them, while still applying any property modifiers that it can handle. Such skipped property modifiers may be preserved upon a file save operation by leaving the unknown property modifiers intact and writing them out to permanent storage.

Further, the present invention can be applied to other uses where representing a change in a data structure is more convenient than representing the full set of values for that structure. For example, as a user edits a document and changes property values, rather than making changes to each and every property structure changed, one can merely record the change as one of more improved property modifier/value groupings, and apply those changes only as needed for displaying the document.

These improved property modifiers can also be used to represent the differences between a "style" and its base style for a word processing program. This makes it very efficient to represent a hierarchy of styles, with each style based on a parent style. Changes to a parent style then ripple forward to the children styles, because each child is defined as its difference between itself and its parent. Specifically, one can define a "Normal" style, which is applied to the majority of text in a document, and an "Emphasis" style that is based on Normal, with the change that "bold" is turned on. For example, if the font of the "Normal" style is changed say from "Courier" to "Helvetica", so also is the font of the "Emphasis" style changed.

It will be appreciated that the improved "single property modifiers" or sprms described above, when combined into sets, can represent a difference between the values of a structure with base (or default) values and another instance of the same structure with different values. In the case where it's common for a large structure with many individual values to have most of those values take on default values, this represents a very space efficient way to store the values of the specific structure instance.

Further, these improved property modifiers make it possible to add new fields to the structure, or rearrange fields, without invalidating the sprm groups stored in a file. Because the structure itself is not stored, but rather only differences in values in specific fields, the file-base representation has no dependence on the specifics of the structure. This is significant for storing binary data for an application program document when that application program will undergo revisions over time. It makes it easier for features to be added to the application program and corresponding values to be stored in the application program's documents, while allowing older and newer versions of the same application to continue to correctly interpret the binary files created by different program versions.

Accordingly, an improved method and system for applying formatting information to strings of text, text objects such as paragraphs, sections, or other data has been described. In accordance with the principles of the invention, a wide variety of formatting information may be associated with the string of text while preserving the ability for different versions of a computer application program to cross-handle files created with other versions of the program. The principles of the present invention are also readily applicable to virtually any type of computer application program such as databases, spreadsheets, web browsers, etc. Other uses and modifications of the present invention will be apparent to persons of ordinary skill in the art without departing from the spirit and scope of the present invention. All of such uses and modifications are intended to fall within the scope of the appended claims.

What is claimed is:

1. A computer-readable medium having stored thereon a data structure, comprising:

a property information array stored in association with a program module stored on the computer-readable medium, the property information array comprising values corresponding to formatting information for altering an appearance of data elements on one of the video output and printer output device, the data elements being contained in a computer file upon which the program module is operative for manipulating;

a data element structure for storing data elements, said data elements including text;

a property modifier structure for storing data formatting property modifiers and arguments operatively linked to respective data formatting property modifiers, each data formatting property modifier containing encoded formatting-related information corresponding to the data elements, each data formatting property modifier comprising an index field containing an index into the property information array associated with the program module, each data formatting property modifier comprising a size field containing information indicating the size of argument for the data formatting property modifier, said size field enabling said program module to skip over a respective data formatting property modifier and its argument if unrecognized by said program module.

2. The computer-readable medium of claim 1, wherein each data forming property modifier further comprises a data type code field containing a data type code indicative of a type of data object for formatting to which the data formatting property modifier applies.

3. The computer-readable medium of claim 1, wherein each data formatting property modifier further comprises a special handling data field containing information indicating whether the data formatting property modifier requires a special handling operation.

4. The computer-readable medium of claim 1, further comprising a data formatting structure for storing linking information that associates the data elements with corresponding data formatting property modifiers.

5. The computer-readable medium of claim 1, wherein the property modifier structure comprises a list of groups of data formatting property modifiers, each group comprising a count of the number of bytes contained in the group, at least one of the data formatting property modifiers and a property modifier argument for each of the, data formatting property modifiers in the group.

6. A computer-implemented method of formatting information in a program module operative in a computer system, comprising the steps of:

storing a property information array in association with the program module, the property information array containing values corresponding to formatting information for altering an appearance of textual data on one of a video output and printer output device;

providing at least one group of data formatting property modifiers and corresponding arguments in a property modifier structure, said arguments being operatively linked to respective data formatting property modifiers, each data formatting property modifier comprising encoded formatting-related information containing a size field including information indicating the size of its property modifier argument and an index field comprising an index into the property information array;

traversing the group of data formatting property modifiers associated with selected textual data if the program module does not recognize said property modifier structure by utilizing the information in the size field of the current data formatting property modifier to determine the location of the next data formatting property modifier in the group of data formatting property modifiers; and applying formatting to the selected textual data if the program recognizes said propert modifier structure by using the index of each data formatting property modifier associated with the selected textual data to access the values corresponding to formatting information maintained in the property information array.

7. The computer-implemented method of claim 6, wherein the step of traversing the group of property modifiers is conducted in response to a computer display operation.

8. The computer-implemented method of claim 6, further comprising the step of displaying the selected information in accordance with the formatting information.

9. The computer-implemented method of claim 8, wherein the step of displaying the selected information in accordance with the formatting information comprises the steps of:

in response to an operation to display information, determining the selected information to be displayed;

determining the property modifier group associated with the selected information to be displayed, locating each data formatting property modifier in the property modifier group associated with the selected information to be displayed, utilizing the index of each data formatting property modifier to reference the property information array associated with the program module to obtain formatting information, and applying the formatting information to the selected information to be displayed.

10. The computer-implemented method of claim 6, wherein each data formatting property modifier further comprises a data type code field comprising a data type code indicative of a type of data object for formatting to which the data formatting property modifier applies.

11. The computer-implemented method of claim 10, wherein each data formatting property modifier further comprises a special handling data field comprising information indicating whether the data formatting property modifier requires a special handling operation.

12. A computer-readable medium having stored thereon a word processing data structure, comprising:

a word processing program module stored on said computer-readable medium;

a property information array stored in association with said word processing program module, the property information array comprising a table corresponding to formatting information for altering an appearance of text-related data in a computer file stored on said computer-readable medium upon which the word processing program module is operative for manipulating, said table containing handling information for applying said formatting information to said text-related data when said text-related is printed or displayed;

said computer file including:
- a data element structure for storing the text-related data;
- a property modifier structure for storing data formatting property modifiers and arguments corresponding to the data formatting property modifiers, each data formatting property modifier comprising encoded formatting-related information including a size field containing information indicating the size of the argument for the data formatting property modifier, each size field enabling said word processing program module to traverse a respective data formatting propert modifier and its argument if unrecognized by said word processing program module; and a data formatting structure for storing linking information that associates the text-related data with corresponding data formatting property modifiers.

13. The computer-readable medium of claim 12, wherein each data formatting property modifier further comprises an index field containing an index into the property information array associated with the word processing program module.

14. The computer-readable medium of claim 12, wherein each data formatting property modifier further comprises a data type code field containing a data type code indicative of a type of a data object for formatting to which the data formatting property modifier applies, said data type code field indicates at least one of a character, a paragraph section, a table, and a picture.

15. The computer-readable medium of claim 12, wherein each data formatting property modifier further comprises a special handling field containing information indicating whether the data formatting property modifier requires a special handling operation outside of normal processing operations by said word processing program.

16. The computer-readable medium of claim 12, wherein the property modifier structure comprises a list of groups of data formatting property modifiers, each group comprising a count of the number of bytes contained in the group, at least one of the data formatting property modifiers, and a property modifier argument for a corresponding data formatting modifiers in the group.

17. The computer-readable medium of claim 12, wherein said data formatting property modifiers indicate at least one of font size, an increase or decrease in font size, bold, and italics for said text-related data.

* * * * *

UNITED STATES PATENT AND TRADEMARK OFFICE
CERTIFICATE OF CORRECTION

PATENT NO.    : 6,457,013 B1
DATED         : September 24, 2002
INVENTOR(S)   : Saxton et al.

It is certified that error appears in the above-identified patent and that said Letters Patent is hereby corrected as shown below:

Column 3,
Line 50, Table 3, 3rd Column "sprBit" should read -- spraBit --

Column 8,
Line 38, "ca store" should read -- can store --

Column 15,
Line 11, "afray" should read -- array --

Column 16,
Line 17, "such as. character" should read -- such as, character --
Line 21, "for ie sprmcsize," should read -- for the sprmCSize, --
Line 56, "irndex" should read -- index --

Column 18,
Line 17, "can locate s this" should read -- can locate this --

Column 22,
Line 27, "FIG. 800." should read -- FIG. 8. --

Column 25,
Line 66, "of the, data" should read -- of the data --

Column 26,
Line 27, "propert" should read -- property --

UNITED STATES PATENT AND TRADEMARK OFFICE
CERTIFICATE OF CORRECTION

PATENT NO. : 6,457,013 B1
DATED : September 24, 2002
INVENTOR(S) : Saxton et al.

It is certified that error appears in the above-identified patent and that said Letters Patent is hereby corrected as shown below:

Column 27,
Line 25, "propert" should read -- property --

Signed and Sealed this

Twenty-ninth Day of July, 2003

JAMES E. ROGAN
*Director of the United States Patent and Trademark Office*